April 22, 1941. C. K. ANTONOPULOS 2,239,544
DIRECTION INDICATOR SIGNAL.
Filed Nov. 20, 1939 2 Sheets-Sheet 1
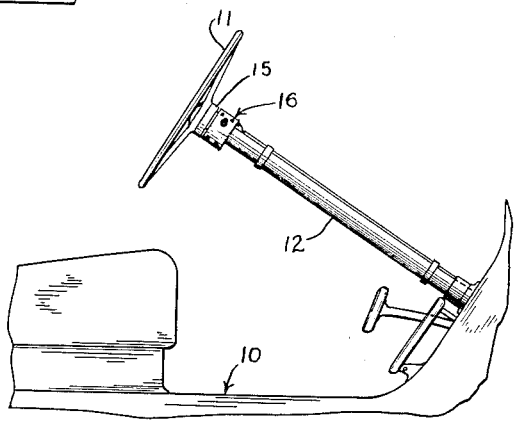
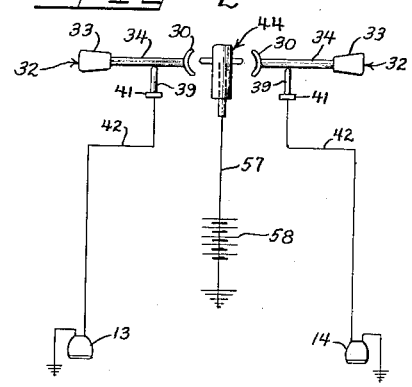
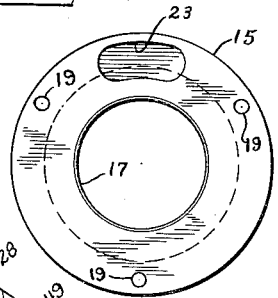
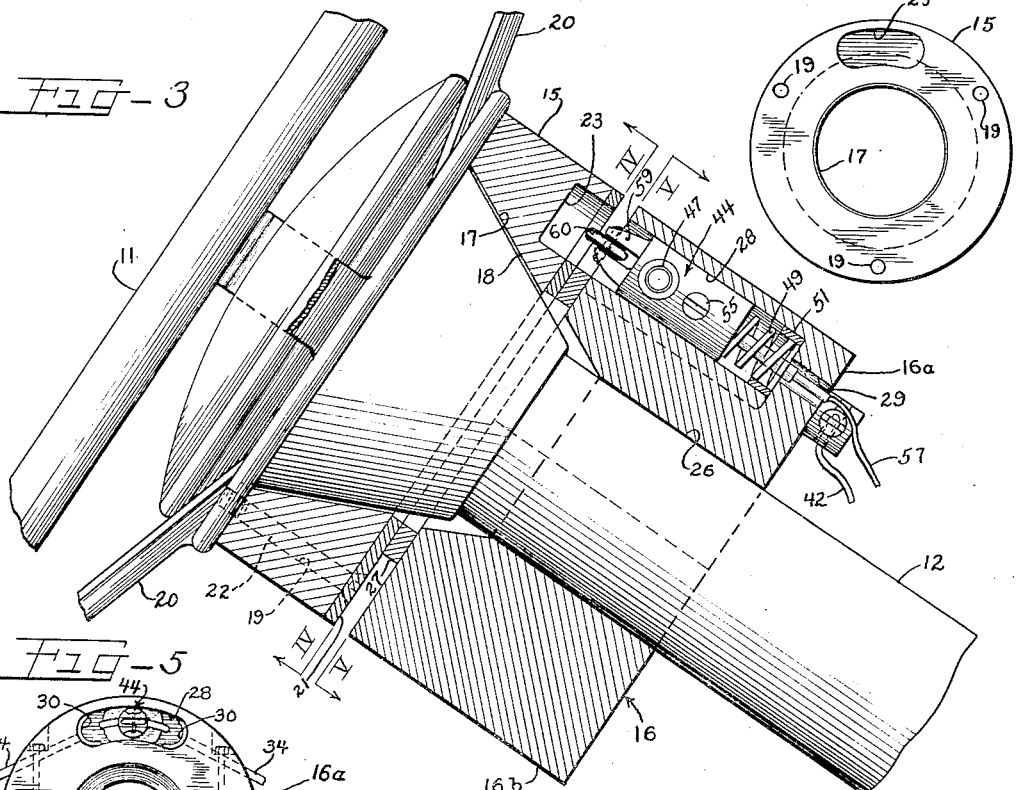
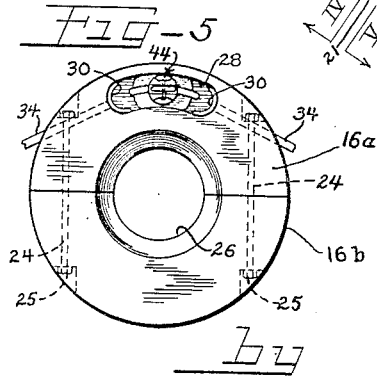
Inventor
Christ K. Antonopulos April 22, 1941.  C. K. ANTONOPULOS  2,239,544
DIRECTION INDICATOR SIGNAL
Filed Nov. 20, 1939  2 Sheets-Sheet 2
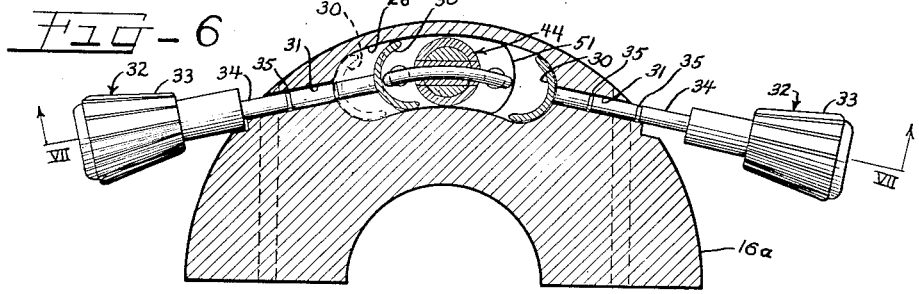
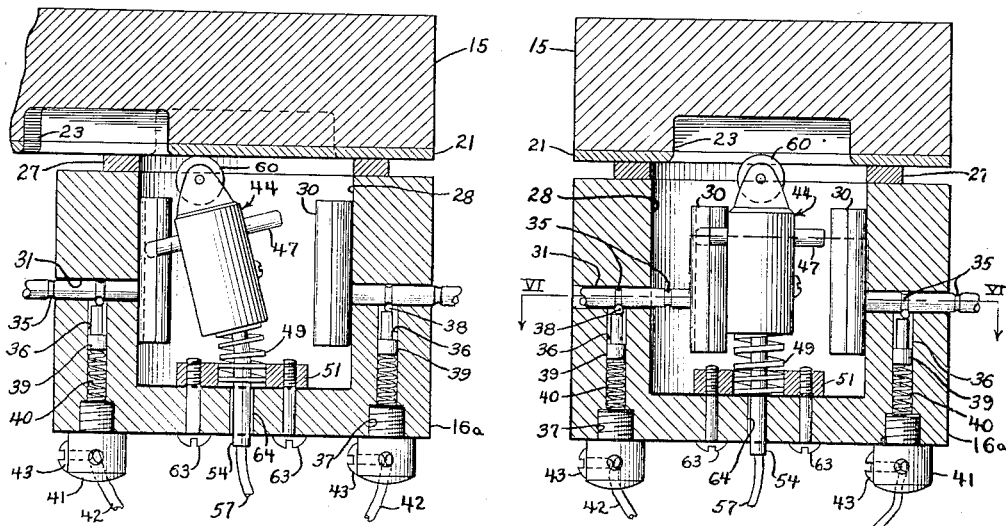
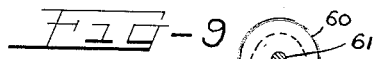
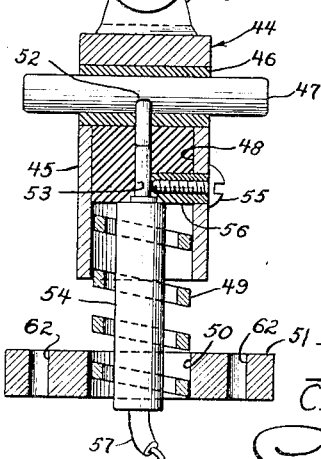
Inventor
Christ K. Antonopulos
by
Attys Patented Apr. 22, 1941

2,239,544

UNITED STATES PATENT OFFICE 2,239,544

DIRECTION INDICATOR SIGNAL

Christ K. Antonopulos, Chicago, Ill.

Application November 20, 1939, Serial No. 305,232

10 Claims. (Cl. 200—59)

The present invention relates to a direction signal, and more particularly to a novel direction indicator signal for automotive vehicles.

An object of the present invention is to provide a new and novel direction or turn-signal switch for automotive vehicles.

Another object of the invention is the provision of an improved directional signal for automobiles.

A further object of the invention is the provision of a switch which is operated either manually or by rotative movement of a steering wheel of an automotive vehicle for controlling the circuit connections to signal devices.

A further object of the invention is the provision of manually operated means, independent of the steering apparatus, to selectively close or open circuit connections to signal devices which indicate the direction to be turned by the vehicle.

Another object of the invention is the provision of control means for signals or the like, wherein circuits are automatically closed or opened in accordance with the movement of a movable part of the structure.

A further object of the invention is the provision of a signal device wherein circuits are automatically closed or opened by movement of the steering wheel to indicate direction of turn of the vehicle.

The invention has for a further object the provision of a signal device in which the circuit connections may be selectively pre-set by manual means to indicate a direction of turn while the vehicle is running in a straight line, with the circuit being automatically opened after the turn is made by the rotation of the steering wheel to bring the vehicle back into straight-line operation.

A still further object of the invention is the provision of a simple, efficient and sturdy switch mechanism adapted for installation on automotive vehicles already in service or at the time of manufacture.

The novel features which I believe to be characteristic of my invention are set forth with particularity in the appended claims. My invention itself, however, both as to its organization and manner of construction, together with further objects and advantages thereof, may best be understood by reference to the following description taken in connection with the accompanying drawings, in which:

Figure 1 is a fragmental elevational view, illustrating the manner of operatively attaching the signal device of the present invention to the steering post and wheel of an automotive vehicle;

Figure 2 is a wiring diagram of the circuits;

Figure 3 is an enlarged vertical sectional view, with parts in broken elevation, illustrating details of the signal device of the present invention when attached to the steering mechanism of an automotive vehicle;

Figure 4 is a reduced plan view of the upper part of the signal device, as seen in the plane indicated by the line IV—IV of Figure 3;

Figure 5 is a reduced plan view of the lower part of the signal device, as seen in the plane indicated by the line V—V of Figure 3;

Figure 6 is a transverse sectional view of the switch half of the lower part of the signal device, with parts in elevation, taken substantially in the plane indicated by the line VI—VI of Figure 7;

Figure 7 is a vertical sectional view, with parts in elevation, as seen in the plane indicated by the line VII—VII of Figure 6, and illustrating the position of the parts, including the upper base plate, in the signal device when one circuit is manually closed;

Figure 8 is a vertical sectional view, similar to Figure 7, illustrating the position of the parts when the switch is operated by movement of the steering wheel to close one of the circuits;

Figure 9 is a vertical sectional view, with parts in elevation, illustrating details of the rocker contact arm.

As shown on the drawings:

In Figure 1, the reference numeral 10 designates generally an automobile equipped with a conventional steering apparatus including a steering wheel 11 and a steering column 12. The vehicle is supplied with a directional signal 13 to indicate left turns and another signal 14 to indicate right turns (see Figure 2). It should be understood, of course, that these signals can be mounted either at the front or rear end of the automobile, as desired.

The device of the present invention is operated either automatically by rotative movement of the steering wheel of the vehicle or manually by the vehicle operator.

The switch device includes a cam base plate 15 and a switch box 16 which are preferably fashioned of insulating material, such as fiber, "Bakelite," a plastic or the like. As illustrated in Figures 3 and 4, the base plate 15 is provided with a central aperture 17, tapered for slidingly receiving the complemental steering wheel hub 18. Openings 19 are provided for receiving screws, bolts or other attaching means to fasten the base plate to the steering wheel spokes 20. On its lower face, the base plate is provided with a metal plate 21 for a purpose to be later explained. This metal plate may be retained in place by the same fastening means which secure the base plate 15 to the steering wheel spokes 20 and, as shown in Figure 3, this fastening means is a flat-headed bolt 22. A shallow recess 23 is formed in the plates 15 and 21 near the outer edges thereof for a purpose to be hereinafter more fully described.

While the plates 15 and 21 have been illustrated as being of one-piece construction, these plates may be split in half-sections to facilitate their installation on automobiles already in service, and the sections mated by bolts or other fastening means. As best shown in Figures 3 and 5, the switch box 16 is composed of two mating half-sections 16a and 16b held together in assembled relation by means of bolts 24 and nuts 25. When mated, the box sections are formed to provide a central aperture 26 therethrough for receiving the steering column 12 in clamped relation therewith.

As shown in Figure 3, the switch box 16 is clamped to the steering column 12 directly below the cam plate 15 and is spaced therefrom by a metal spacer 27. The outside diameter of this spacer is such that when the spacer is concentrically secured to the switch box 16, it will not project into the recess 23. The means for securing the spacer to the switch box (not shown) may be flat-headed bolts similar to the bolts 22 or other similar securing means. By providing the metal plate 21 and the metal spacer 27, a metal to metal sliding contact is provided when the cam plate 15 is rotated with the steering wheel 11.

A deep recess 28 is provided in the half-section 16a of the switch box near its outer edge and is positioned to face the recess 23 when the steering wheel 11 is in a position to steer the vehicle in a straight line. An opening 29 extends centrally of the recess 28 through the bottom of the switch box. At the curved ends of the recess 28, there are positioned a pair of complemental U-shaped metal conductors 30, preferably of brass, as shown in Figure 6. Openings 31 are angularly provided through the wall of the half-section 16a to connect both ends of the recess 28, and through which extend operating handles 32. Each of these handles includes a manipulating portion 33 fashioned of some insulating material. A metal rod 34, of brass or other conducting material, extends from the manipulating portion 33 into threaded engagement with the conductor 30 at a point adjacent its lower end. The rods 34 are provided with a pair of axially spaced grooves 35 which define limits of transverse movement of the conductor 30 when the operator of the vehicle manipulates the handles 33.

As clearly shown in Figures 7 and 8, a pair of openings 36 extend upwardly from the bottom of the half-section 16a to connect with the openings 31 on both sides of the recess 28. The lower portions of these openings are threaded, as shown at 37. Inserted within each of the openings 36 is a small metal ball 38, preferably of steel, adapted to seat within one of the slots 35. These steel balls are maintained in seated relation with the slots by a brass plug 39 which is urged in an upward direction by a coil spring 40 which seats against a terminal post 41. These terminal posts are threaded into the threaded portions 37 provided at the lower ends of the openings 36. Suitable wires 42 connect the terminal posts to their respective signal lights by means of screws 43, as shown in Figure 2.

As clearly shown in Figure 6, the manipulating portions 33 may be operated by the driver of the vehicle to move the conductor 30 within the slot 28 a distance defined by the slots 35. In this figure, the handles are illustrated in their two limited positions. Compression of the coil spring 40 urges the ball 38 into seated relation with a slot 35 to maintain the handle in the limiting position to which it is moved.

As best shown in Figures 7, 8 and 9, a rocker contact arm, generally designated by the reference numeral 44, is centrally mounted in the recess 28. This rocker contact arm is counterbored to form a shell 45 which is provided at its blind end with a transverse opening for tightly receiving an insulating sleeve 46 and a contact pin 47 having ends which extend beyond the side surfaces of the arm. A centrally apertured insulating block 48 abuts the sleeve 46 within the shell 45 and extends along a portion of its length. The lower or open end of the shell 45 is adapted to receive one end of a coil spring 49, the other end of which is received in an aperature 50 provided in a base plate 51. The ends of the spring 49 are retained within the shell 45 and base plate 51 either by compression, welding or other similar means.

A short contact pin 52 is secured within the aperture of the insulating block 48 and extends through the sleeve 46 and partially into the contact pin 47. A longer removable contact pin 53 is partially jacketed by an insulator 54 and is held in contact with the contact pin 52 by means of a screw 55. The screw 55 is insulated from the wall of the shell 45 by means of an insulating sleeve 56. As shown in Figures 2 and 9, a wire 57 connects the contact pin 53 with a battery 58. At the upper end of the shell 45, there is provided a pair of spaced integral legs 59 which carry a roller 60 by means of a pin 61.

The base plate 51 has provided therein a pair of threaded openings 62 in spaced relation from the central aperature 50. In registry with these openings is a pair of openings provided through the bottom portion of the half-section 16a and through which extend bolts 63 in threaded relation with the base plate 51. Another opening 64 is provided in the base portion of the half-section 16a between the openings 62, through which extends the insulator 54 and the electrical wire 57.

From the foregoing description, it will be understood that the switch box 16 can be manually operated by manipulation of the handles 33 and can also be automatically operated by a mere rotation of the steering wheel 11. Thus, the driver can give a turn signal well in advance of the contemplated turn by moving either conductor 30 into engagement with the contact pin 47, as shown in the dotted and full line positions of Figure 6.

With the conductor in its dotted line position, the electrical circuit from the battery to the signal light is open. In this position, the parts are shown in the wiring diagram of Figure 2. By operating the handles 32, which are in easy reach from the steering wheel, the conductors 30 are moved into engagement with the contact pin 47, thereby closing the circuit to selectively give a proper turn signal.

As clearly shown in Figures 7 and 8, the switch box can be automatically operated by rotating the steering wheel. It is to be noted in Figure 7 that the roller 60 partially extends into the recess 23 when the steering wheel is in a position to steer the vehicle in a straight line. When the parts are in this position, the signal light may be operated manually by the driver of the vehicle. When the steering wheel is rotated to turn the front wheels of the vehicle, the recess 23 is turned so that an edge thereof strikes against the roller 60. By reason of its spring mounting, the rocker contact arm 44 is rocked sideways until the contact pin 47 engages with an adjacent conductor 30. The original position of the recess 23, before the steering wheel is rotated, is shown in dotted lines, and its rotated position is shown in full lines.

It is to be noted that the coil spring 49 not only allows the contact arm 44 to be rocked sideways, but also to be depressed downwardly to allow the roller 60 to engage the plate 21. When the steering wheel is returned to its original position, the roller 60 allows the metal plate 21 to slide therealong without disengaging the contact between the pin 47 and the conductor 30 until the recess 23 engages with the roller. As the roller 60 is formed of metal, it is obvious that the provision of the metal plate 21 prevents undue wear by the constant rotation of the steering wheel, such as would be experienced if the roller engaged with the insulating material of the cam plate 15.

As present-day automobiles are arranged with steering ratios so that the steering wheel is rotated less than a full turn in order to produce a maximum turning of the front wheels from a straight-ahead position, the recess 23 will engage the rocker arm 44 only when the front wheels are in, or substantially in the latter position. It should be noted that the recess 23 is sufficiently wide to allow for slight rotations of the steering wheel which are necessary in normal straight-ahead vehicle operation.

By turning the steering wheel in either direction from its normal position, a making or breaking of the circuit to the proper signal light is automatically effected. Thus, the driver can manually operate the turn signals or, in the event he forgets to operate them manually, a turning of the steering wheel will automatically give the turn signal. Furthermore, should the driver manually operate the turn signal well in advance of a contemplated turn, a turning of the steering wheel will rock the contact arm 44 against an adjacent conductor 30 to move the latter against the end of the slot 28, thereby automatically disconnecting the engagement when the steering wheel is turned back to its normal position.

While I have shown a particular embodiment of my invention, it will, of course, be understood that I do not wish to be limited thereto, since many modifications may be made, and I therefore contemplate by the appended claims to cover all such modifications as fall within the true spirit and scope of my invention.

I claim as my invention:

1. In an automatic turn signal control for automotive vehicles having a steering column and a hubbed steering wheel, the improvement which comprises a cam plate mounted on the steering wheel around its hub, said cam plate being formed to provide a recess in one end thereof, a switch box mounted on the steering column in closely spaced relation from the recessed end of said cam plate, and switch means being spring mounted at one end in said box for opening and closing signal circuits, said switch means having a portion at its other end adapted to extend into said base plate recess to open said circuits when the steering wheel is moved into a position for driving the vehicle in a straight line, said switch means portion also being adapted to swing in an arc about its spring mounting to close said circuits when the steering wheel is rotated to a position for turning the vehicle.

2. In a turn signal control for automotive vehicles having a steering column and a hubbed steering wheel, the improvement which comprises a base plate mounted on the steering wheel around its hub, said base plate having a recess provided in one end thereof, a switch box mounted on the steering column adjacent said base plate, said switch box having a recess provided therein adapted to register with said base plate recess when the steering wheel is positioned to steer the vehicle in a straight line, a switch for operating electrical circuits mounted in said switch box recess consisting of a floatingly mounted arm, a conductor pin carried by said arm, said arm normally having a portion adapted to extend into said base plate recess, and a pair of spaced conductors positioned on either side of said arm, each of said conductors being adapted to be manually operated to contact said conductor pin whereby said circuits may be selectively opened or closed by the vehicle operator, said circuits also being automatically opened or closed when the steering wheel is turned by moving said recesses out of registry and swinging said floating arm into and out of contact with a conductor.

3. A signal switch comprising a box, a rocker contact member flexibly mounted in said box, a contact pin extending from both sides of the contact member, conductors in said box on both sides of said rocker contact member in spaced relation therefrom, manually operable means outside of said box for independently moving each of said conductors into and out of set engagement with said contact pin at the same or different times, other means outside of said box for rocking said contact member to move the contact pin into and out of engagement with said conductors whereby any previously set engagement therebetween established by said first means is automatically broken.

4. A switch for a turn signal comprising a box having a recess therein, a pair of movable conductors mounted in said recess for movement toward and away from each other, a handle extending from each conductor to the outside of the box for so moving the conductors, a contact member movably mounted in said recess between the conductors, and an actuator for said contact member adapted to move the contact member into and out of engagement with and in the same plane of movement as the conductors whereby manipulation of said handles or said actuator can open or close the switch.

5. A switch box for a turn signal which comprises a pair of mating half-box sections defining an opening therebetween when mated, a pair of metal conductor strips in one of said box sections, a handle extending from each conductor strip to the outside of the box for moving the strips, each of said handles having a pair of grooves defining limits of movement thereof, a flexible contact member mounted at one end in said one box section between said conductor strips, a contact pin carried by said contact member near its other end and exposed to the side surfaces of the member, said handles being adapted to be selectively moved by the vehicle operator to engage the conductor strips and said contact pin, and an actuator for said contact member adapted to move the member into and out of engagement with the conductor strips thereby automatically breaking any pre-set contact between said conductor strips and contact pin.

6. A switch for a turn signal which comprises two members, one of said members being adapted as an actuator for movement relative to the other of said members, each of said members having a recess normally facing each other, a pair of metal conductor strips in the recess of said other member, a handle extending from each conductor strip through said other member to the outside thereof for moving the strips, each of said handles having a pair of grooves defining limits of movement thereof, spring-urged means carried by said other member for engaging said handle grooves to hold the handles in operated positions, a contact member mounted at one of its ends in the recess of said other member between said conductor strips, a contact pin carried by said contact member and exposed through the sides thereof, a spring operatively connected to the contact member to constitute the mounting therefor, and the other end of said contact member normally adapted to extend into the recess of said one member, said handles being selectively actuated by the vehicle operator to move the conductor strips into and out of engagement with the contact pin of said contact member, the sides defining the recess of said one member adapted to move the contact pin of said contact member into and out of engagement with a conductor strip when said one member is moved relative to said other member thereby automatically breaking any pre-set contact therebetween.

7. A signal switch for automotive vehicles having a steering column and a hubbed steering wheel, a base plate having a recess on its bottom surface and adapted to be mounted on said steering wheel around its hub, a switch box comprising a pair of mating half-sections adapted to be clamped around said steering column below said base plate, said switch box having a recess therein registering with the recess in said base plate when the steering wheel is positioned to steer the vehicle in a straight line, a pair of U-shaped metal conductors movably mounted in the switch box recess, a handle extending from each conductor to the outside of the box for moving the conductors, grooves in each handle defining the movable limits thereof, spring-urged means for engaging said grooves to maintain said handles in said limits, a rocker contact arm mounted between said conductors, a spring mounting said contact arm in the recess of said switch box, a contact pin extending from both sides of said contact arm, and a roller mounted on the free end of said contact arm and adapted to normally extend into the recess of said base plate, said handles being selectively operated by the vehicle operator to move said conductors into and out of engagement with said contact pin, the edges of the recess in said base plate when moved by said steering wheel adapted to engage said roller and rock said contact arm into and out of engagement between said contact pin and said conductors, said actuating movement of the base plate automatically effecting a disengagement of a pre-set contact between the contact pin and conductors by operation of said handles.

8. A signal switch box for a turn signal comprising a pair of half-sections defining a mounting aperture therebetween when mated, one of said half-sections having a recess therein, a pair of U-shaped conductors in said recess, a handle extending from each conductor to the outside of the box half-section for moving the conductors, each handle having a pair of grooves defining movable limits of the conductors, a spring-urged member associated with each handle and carried by said one-half section for maintaining the handles in the limits to which they are moved, a contact rocker arm between said conductors in spaced relation therefrom, a spring for mounting one end of said rocker arm in said recess, a roller carried by said rocker arm at its other end, a contact pin extending through the rocker arm on both sides thereof, said handles being selectively operated by the vehicle operator to move the conductors into and out of engagement with said contact pin, and means for rocking said rocker arm by engaging said roller to move the contact pin into and out of engagement with said conductors independently of said engagement and disengagement by said handles.

9. A switch for a turn signal comprising a switch box, a pair of movable conductors positioned in spaced relation from each other, a movable contact member normally positioned in spaced relation from said conductors, an actuator for said contact member to selectively move the contact member into engagement with one or the other of said conductors, and means connected to and extending from each conductor to the exterior of the switch box for varying the spacial relation from said contact member and to selectively engage the contact member independently of movement of the contact member by the actuator.

10. A switch for a turn signal comprising a switch box having a recess therein, a movable conductor normally positioned at each end of said recess, manual actuating means connected to each conductor for independently operating them toward and away from each other, a rockable spring mounted contact member between said conductors and being normally arranged in spaced relation therefrom, and a cam actuator for said contact member adapted for moving it into and out of engagement with one of said conductors, said actuating means and said cam actuator being arranged for independent actuation of the switch to open and closed positions, said contact member being further arranged for automatically breaking any preset contact between said conductors and contact member by said manual actuating means when actuated by said cam actuator.

CHRIST K. ANTONOPULOS.